United States Patent [19]

Kanai et al.

[11] Patent Number: 5,204,921
[45] Date of Patent: Apr. 20, 1993

[54] AUTOMATED OPTICAL MAIN DISTRIBUTING FRAME SYSTEM

[75] Inventors: Tsuneo Kanai; Shigefumi Hosokawa; Kunihiko Sasakura, all of Saitama; Syuichirou Inagaki; Shigeru Umemura, both of Tokyo; Hirobumi Kimura, Saitama; Akira Nagayama, Tokyo; Mitsuhiro Makihara, Saitama; Masao Kawachi, Ibaragi, all of Japan

[73] Assignee: Nippon Telegraph and Telephone Corporation, Tokyo, Japan

[21] Appl. No.: 817,519

[22] Filed: Jan. 7, 1992

[30] Foreign Application Priority Data

Jan. 8, 1991 [JP] Japan .................. 3-706
Jan. 10, 1991 [JP] Japan .................. 3-1502
Jan. 21, 1991 [JP] Japan .................. 3-5392
Oct. 18, 1991 [JP] Japan .................. 3-270903

[51] Int. Cl.$^5$ ............................. G02B 6/30
[52] U.S. Cl. ............................ 385/17; 385/19
[58] Field of Search .............. 385/17, 19; 395/82

[56] References Cited

U.S. PATENT DOCUMENTS 4,615,580 10/1986 Mayer .................... 385/19
4,818,052 4/1989 Le Pesant et al. ........ 385/17

FOREIGN PATENT DOCUMENTS 46707 2/1989 Japan .
2-1632 1/1990 Japan .

Primary Examiner—John D. Lee
Assistant Examiner—S. Barns
Attorney, Agent, or Firm—Martin Novack

[57] ABSTRACT

In an optical MDF (main distributing frame) for interconnecting external subscriber optical lines (122) with office optical lines (131) through jumpering operation, a matrix waveguide (128, 129, 130) having a plurality of crosspoints coupled with external lines and office lines is used. The matrix waveguide has a groove (235 in FIG. 4A) at each crosspoint so that said crosspoint is switched ON or OFF depending upon whether said groove is filled with matching oil or not, so that one of the external lines is connected to the selected office line. Said matching oil has the same refractive index as that of waveguides. Each crosspoint groove is coupled with a respective oil pool (236), which supplies matching oil which has essentially the same refractive index as that of a waveguide to said groove. Switching at a crosspoint is carried out in a manner that a light signal in a waveguide goes straight through the crosspoint when a groove is filled with matching oil, and the light signal changes its direction at the crosspoint through total internal reflection when the groove is empty. A jumpering operation to connect or disconnect a crosspoint is carried out by a robot (133), which fills or pulls out matching oil in the oil pool at the designated coordinates. Each external line is branched by using an optical directional coupler (237) for test purposes, and one of the branch lines subject to test is selected by using a similar 1×N type matrix waveguide. (FIG. 4A)

15 Claims, 14 Drawing Sheets

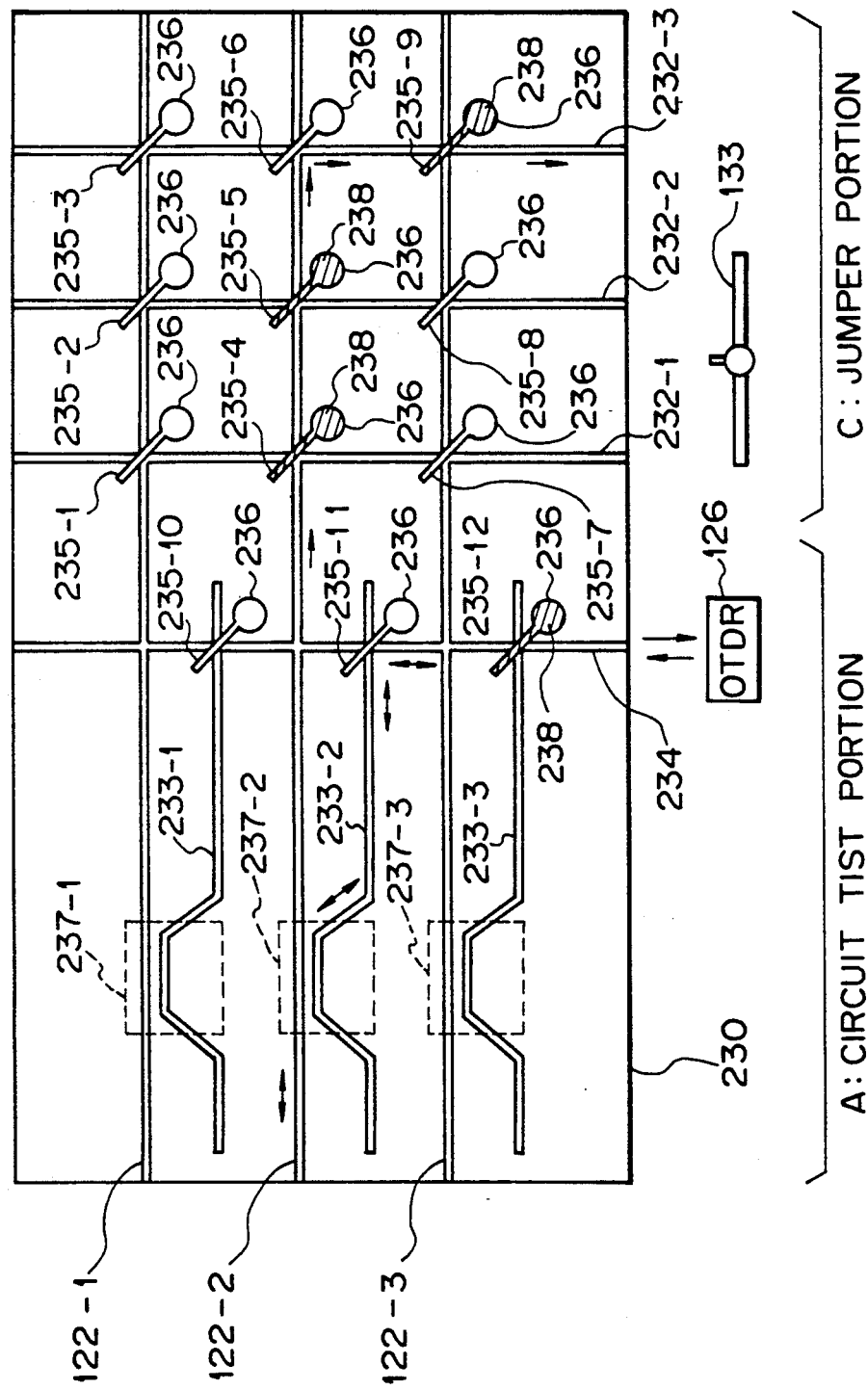

Fig. 12(a)  Fig. 12(b)  Fig. 12(c)
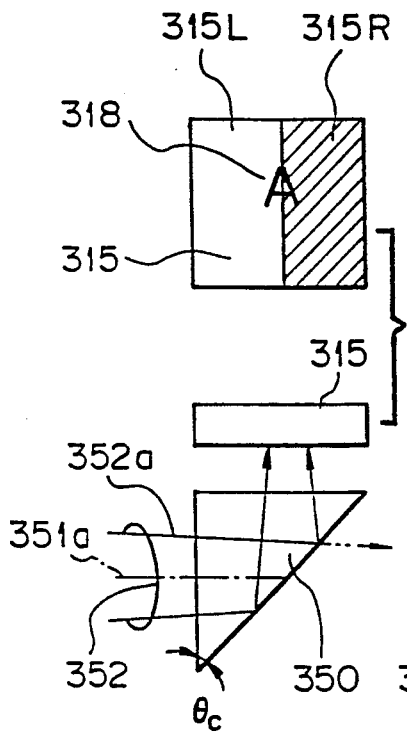
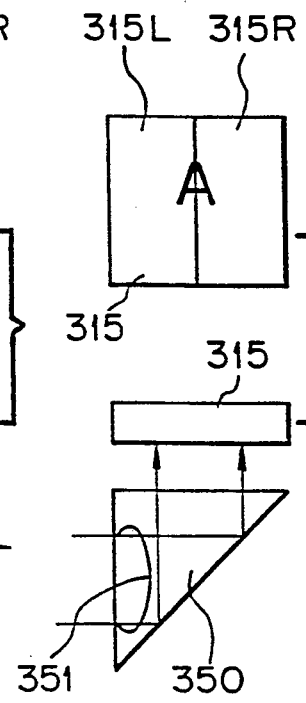
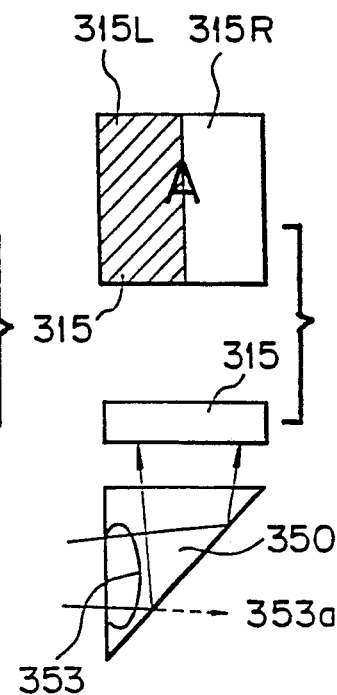
Fig. 12(d)
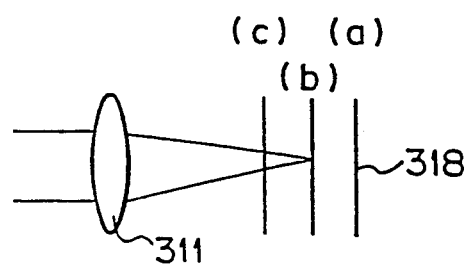

AUTOMATED OPTICAL MAIN DISTRIBUTING FRAME SYSTEM

BACKGROUND OF THE INVENTION

The present invention relates to an optical MDF (Main Distributing Frame) system, which is installed in a telephone office or a data communication office, and interconnects each external lines to respective office lines. The present invention relates, in particular, to an optical MDF system for interconnection of optical fiber lines, and further, the present invention relates to such a system, which automates a jumbering operation for the interconnection.

An MDF (main distribution frame) is installed in a telephone office, a data communication office, or an ordinary business building, and functions to connect each external line to the selected office line, and to test the selected external line by coupling a test apparatus to the selected external line. When a telephone subscriber moves his address, the connection in the MDF must be changed. The connection operation of an MDF is called a jumpering operation.

Conventionally, a jumpering operation is carried out manually.

FIG. 1 shows a concept of a prior optical MDF system. In the figure, the numeral 9 are subscriber optical lines, which are terminated to a terminal board 13. The terminal board 13 has a connector adapter 14 for each subscriber optical line. The numeral 10 are office optical lines, which are terminated by a connector plug 15. One of the connector plugs 15 is manually coupled with the selected connector adapter 14 according to the desired connection of an external line and an office line.

However, a prior manual jumpering operation has the disadvantages that it takes long time for each interconnection, and the labour cost for the operation is coming high. It is afraid that the cost for jumpering operation would occupy much ratio of the total telephone office cost in future when amount of optical communication service increases.

SUMMARY OF THE INVENTION

It is an object of the present invention to overcome the disadvantages and limitations of a prior MDF system.

It is also an object of the present invention to provide an automated optical MDF system which interconnects optical fibers.

It is also an object of the present invention to provide an automated optical MDF system which is handled by a robot.

It is still another object of the present invention to provide an automated optical MDF system in which the positioning of a robot on a desired crosspoint of waveguides is simple and accurate.

The above and other objects are attained by an automated optical MDF system comprising; a jumper section having a link with at least one matrix waveguide deposited on a substrate with a plurality of waveguides intersecting one another at crosspoints; said waveguides being copuled with external optical lines and office optical lines so that each of external lines is connected to selected office lines through a crosspoint of the matrix waveguide; each crosspoint of said matrix waveguide having a groove which is slanted to waveguides by a predetermined angle and is subject to be selectively filled with matching oil which has essentially the same refractive index with that of a waveguide so that a light signal in a waveguide goes straight through the crosspoint when a groove is filled with matching oil, and the light signal changes its direction to another waveguide at the crosspoint through total internal reflection by the groove when the groove is empty; a robot coupled with said matrix waveguide so that the robot is positioned at desired crosspoint of a matrix waveguide to fill and pull out matching oil in a designated groove.

Preferably, an oil pool which is much larger in volume than that of a groove is provided close to the related groove so that the oil pool and the related groove are coupled.

Still preferably, a nozzle of a robot for supplying matching oil to an oil pool is located so that the nozzle coincides with center of an objective lens on a screen of the robot.

BRIEF DESCRIPTION OF THE DRAWINGS

The foregoing and other objects, features, and attendant advantages of the present invention will be appreciated as the same become better understood by means of the following description and accompanying drawings wherein;

FIG. 4A shows detailed view of a matrix waveguide and a directional coupler, FIG. 12(a) and 12(b), 12(c) and 12(d) shows operation of focusing of an objective lens of a robot.

DETAILED DESCRIPTION OF THE EMBODIMENTS

Figure 1:
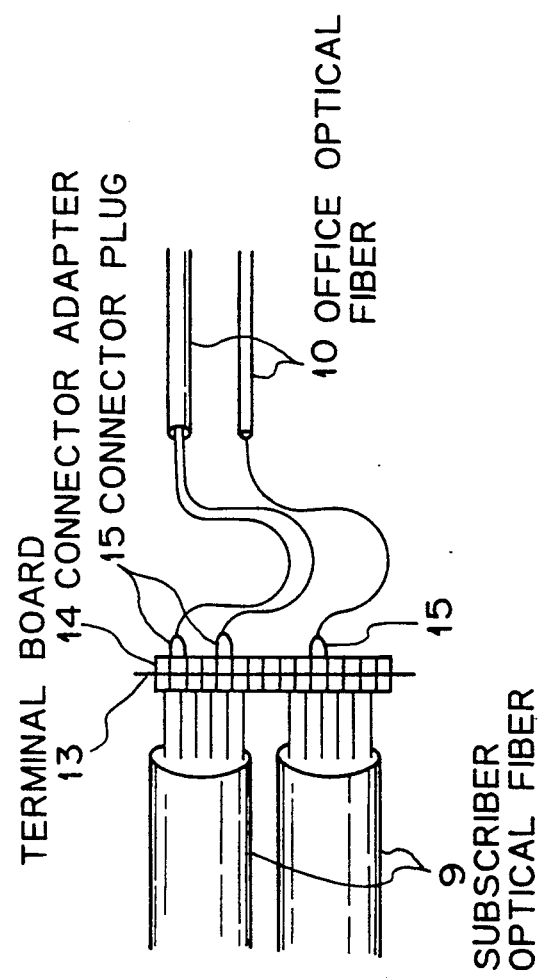
FIG. 1 shows a prior optical MDF system.
Figure 2:
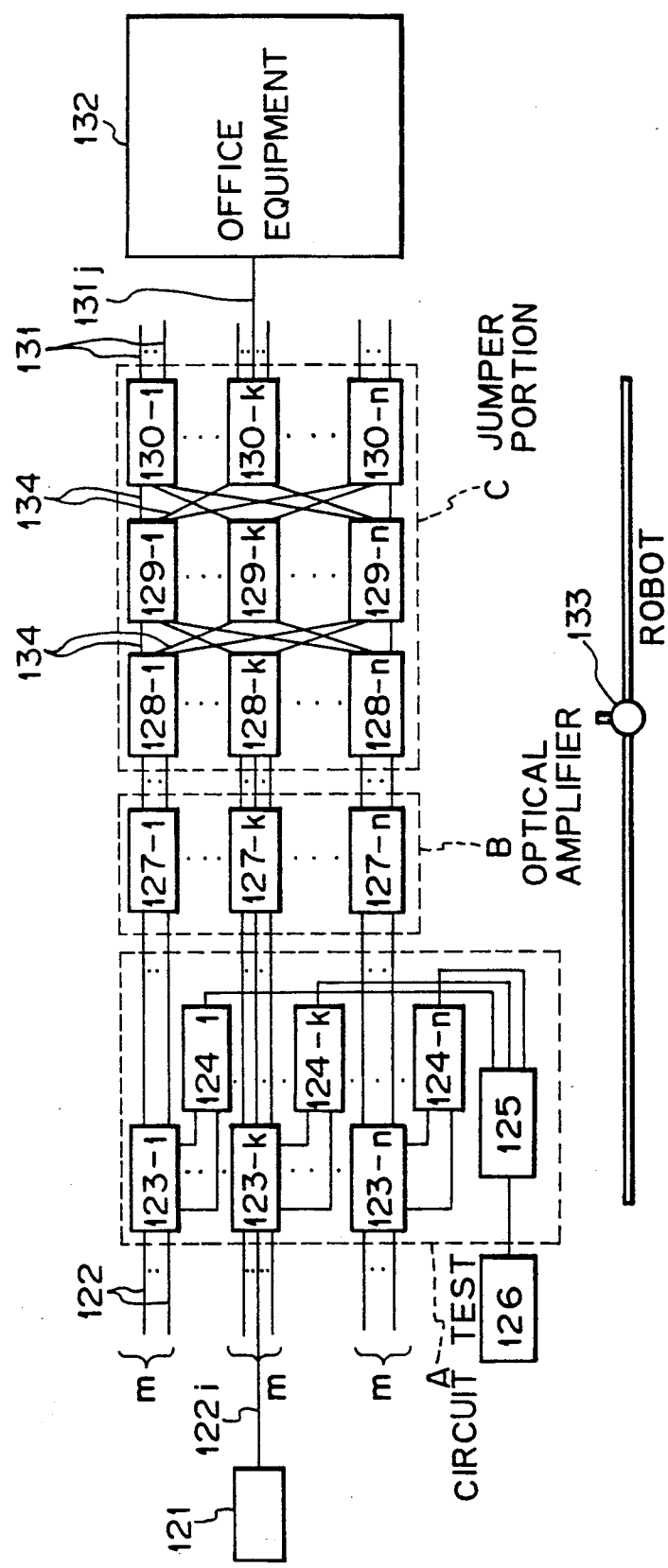
FIG. 2 shows a block diagram of an optical MDF system according to the present invention.

FIG. 2 shows a block diagram of an automated optical MDF system according to the present invention. The embodiment is described that an optical signal is forwarded from a subscriber optical line to an office optical line, but of course the opposite direction transmission is possible.

In the figure, the numeral 121 is an optical terminal apparatus, 122 is an optical subscriber line which couples a subscriber terminal apparatus 121 with office equipment, 123-1 through 123-n are a directional coupler board which is connected to a subscriber optical line 122. Each board 123-1 through 123-n mounts m number of directional couplers, where m and n are an integer. The numerals 124-1 through 124-n are a matrix waveguide which has m number of inputs and one output, 125 is another matrix waveguide having n number of inputs and one output, 126 is an optical pulse test device coupled with an output of the matrix waveguide 125, 127-1 through 127-n are n number of optical amplifiers coupled with subscriber optical lines 122. The optical amplifier 127-i ($1 \leq i \leq n$) is implemented for instance by a linear laser diode array, 128-1 through 128-n are first stage matrix waveguides each having m number of inputs and n number of outputs, 129-1 through 129-n are second stage matrix waveguides each having m number of inputs and n number of outputs, 130-1 through 130-n are third stage matrix waveguides each having m number of inputs and n number of outputs, 131 is a plurality of optical office lines, 132 is office equipment, 133 is a robot which functions to control switching of each cell of matrix waveguides (124-i, 125, 128-i, 129-i, 130-i) by supplying and pulling out matching oil in a groove as mentioned hereinafter, and 134 is a link line for connecting matrix waveguides 128-i, 129-i and 130-i.

The circuit test portion A comprises said directional coupler boards 123-1 through 123-n, said matix waveguides 124-1 through 124-n, and said matrix waveguide 125.

The optical amplifier portion B which is used only when circuit loss is large comprises said optical amplifier boards 127-1 through 127-n.

Figure 3:
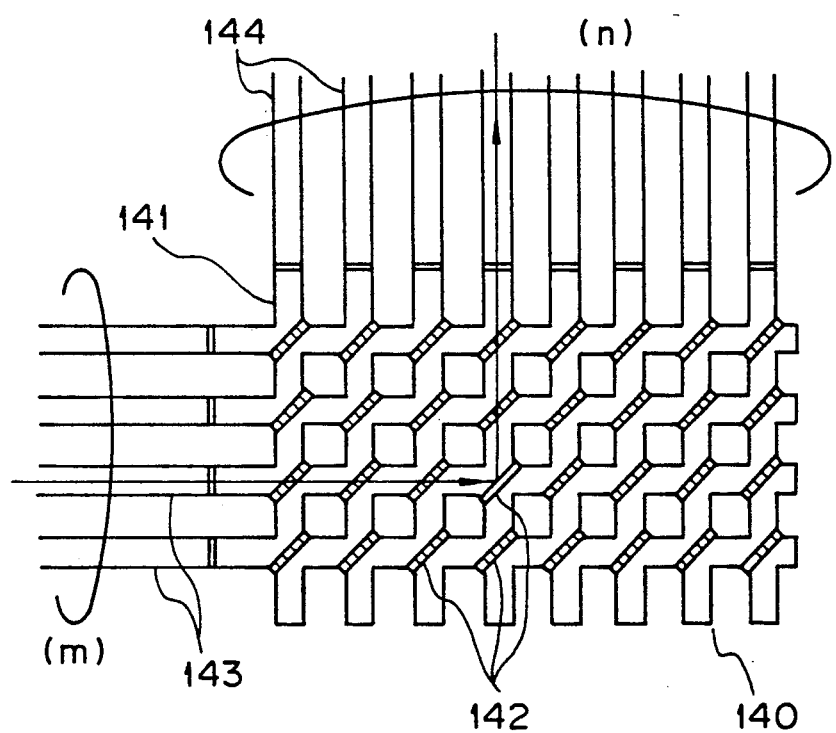
FIG. 3 shows detailed view of a matrix waveguide.

The jumper portion C which effects the connection of each external optical line to the selected office line comprises a link of matrix waveguides 128-1 through 128-n, 129-1 through 129-n, and 130-1 through 130-n. Although the embodiment shows three stage link structure, a jumper portion having only one stage matrix waveguide or having more than four stages is of course possible FIG. 3 shows an enlarged plane view of a matrix waveguide having (m × n) crosspoints defined by a pair of intersecting waveguides. In the figure, the numeral 140 is a matrix waveguide, 141 shows a plurality of waveguides which are arranged in a matrix form so that a crosspoint is defined by a pair of waveguides which cross with a predetermined angle, 142 is a groove which is provided at each crosspoints of a matrix waveguides so that said groove is slanted to the longitudinal direction of the waveguides, 143 shows m number of optical fibers which are inputs to the matrix waveguide, and 144 shows n number of optical fibers which are outputs of the matrix waveguide. An oil pool (not shown in FIG. 3) is provided for each crosspoint so that an oil pool is coupled with the related groove through a conduit for supplying and pulling out matching oil to and from the groove. The waveguides 141 are coupled with the optical fibers 143 and 144 by using optical connectors (not shown).

When said groove 142 is filled with matching oil which has the same refractive index as that of the waveguides, a light signal in a waveguide goes straight through the groove. On the other hand, when the groove 142 is emply, or filled with air which has smaller refractive index than that of waveguides, a light signal in a waveguide is reflected by the groove wall through internal total reflection. Therefore, a light signal from an optical fiber 143 is transmitted to an output optical fiber 144, through waveguide 141, grooves 142 which are filled with matching oil (shaded grooves in the figure), another groove which is empty (no shaded groove in the figure) and provides internal total reflection, and an optical fiber 144.

All the grooves 142 are first filled with matching oil, and then, matching oil in each groove is selectively pumped out according to the desired connection of an external line and an office line.

The structure of the matrix waveguides 124-1 through 124-n, and 125 is similar to that of FIG. 3, except that only one output waveguide is provided.

It is assumed that an external line 122-i is to be connected to an office line 131-i. First, the first stage matrix waveguide 128-k which mounts the external line 122-i, and the third stage matrix waveguide 130-k which mounts the office line 131-i are determined, and then, the second stage matrix waveguide 129-k is selected so that it can be connected to both the external line 122-i and the office line 131-i. Then, the grooves on the matrix waveguides 128-k, 129-k and 130-k are selected so that the external line 122-i is connected to the office line 131-i. Then, the matching oil in those selected grooves is pumped out by using a robot. Thus, the external line 122-i is connected to the office line 131-i through the internal total reflection at the grooves 128-k, 129-k and 130-k.

The external line 122-i can be tested as follows. First, the directional coupler 123-k which mounts the external line 122-i is determined. Then, the groove in the matrix waveguide 125 coupled with said determined directional coupler 123-k which is connected to the matrix waveguide 124-k, and is coupled with the circuit test apparatus 126, is pumped out by using a robot. Then, the groove on the matrix waveguide 124-k coupled with the external line 122-i is pumped out. When the optical circuit test apparatus 126 transmits an optical test signal, that signal is sent to the optical line 122-i through the matrix waveguides and the directional coupler. The apparatus 126 tests whether the line 122-i is open or short-circuited by detecting rear reflection signal of the test signal.

FIG. 4A shows an embodiment of an enlarged plane view of a circuit test portion A, and a part of a jumper portion C. An optical amplifier is not shown for the sake of simplicity. In the figure, the numeral 230 is an optical matrix board which mounts both a directional coupler and a matrix waveguide on a common single substrate.

The optical matix board 230 has a single substrate which is made of for instance Si, and a first group of waveguides 122-1 through 122-3, a second group of waveguides 232-1 through 232-3, a third group of waveguides 233-1 through 233-3, a fourth waveguide 234, linear grooves at crosspoints 235-1 through 235-12, and 236 is an oil pool which is coupled with grooves 235-1 through 235-12 deposited on said substrate through photolithography process.

A first group of waveguides 122-1 through 122-3 are arranged parallel to one another, and are coupled with external optical lines. A second group of waveguides 232-1 through 232-3 are also parallel to one another, and intersect with a predetermined angle with a first group of waveguides, and are coupled with office lines. A crosspoint is defined by each of first group of waveguides and each of second group of waveguides. A third group of waveguides 233-1 through 233-3 are closely located to said first group of waveguides so that the spacing between each first group waveguide and each second group waveguide is in the order of wavelength of an optical signal, so that optical directional couplers 237-1 through 237-3 are provided. The fourth waveguide 234 is parallel to the second group of waveguides, and is coupled with an optical test apparatus 126.

The grooves 235-1 through 235-9 are provided at crosspoints of a first group of waveguides and a second group of waveguides. The grooves 235-10 through 235-12 are provided at the crosspoints of a third group of waveguides and the fourth waveguide. The oil pools 236 are provided so that each of them is coupled with a respective groove.

The angle between a groove and related waveguides is determined so that a light signal in a waveguide is subject to internal total reflection by a side wall of the groove, and said light signal is offset to an intersected waveguide. When a groove is filled with matching oil which has the same refractive index as that of a waveguide, a light signal in a waveguide goes straight through a groove. Therefore, a switching of a light signal at a crosspoint is effected whether a groove is filled with matching oil or not.

A robot 133 functions to fill a groove with matching oil, and/or pump out the matching oil, through an oil pool.

It is assumed that an external line coupled with a waveguide 122-2 is connected to an office line connected to a waveguide 232-3. In this case, the grooves 235-4, 235-5, and 235-9 are filled with matching oil, and the groove 235-6 is pumped out. Then, a light signal in the waveguide 122-2 goes through the grooves 235-4, 235-5, 235-6, and 235-9 to an office line coupled with the waveguide 232-3.

Next, assuming that an external line coupled with the waveguide 122-2 is tested, then, the groove 235-11 is pumped out, and the groove 235-12 is filled with matching oil. Then, an optical signal by a test apparatus 126 goes through the waveguide 234, the groove 235-12, the groove 235-11, to the waveguide 233-2, which is optically coupled with the waveguide 122-2 by the optical directional coupler 237-2. Therefore, the light signal is provided to the waveguide 122-2, and is sent to an external line. If a reflection occurs in the optical line, the reflected light comes back through the same route with the delay time based upon the location of the reflection. So, when the test apparatus 126 detects the reflection light, it is determined whether the line is open or short-circuited, and where it happens.

If the wavelength of a test light differs from the wavelength of the signal light, and a directional coupler is designed to couple only the wavelength of the test light, the circuit test is effected without affecting signal lights.

Figure 4B:
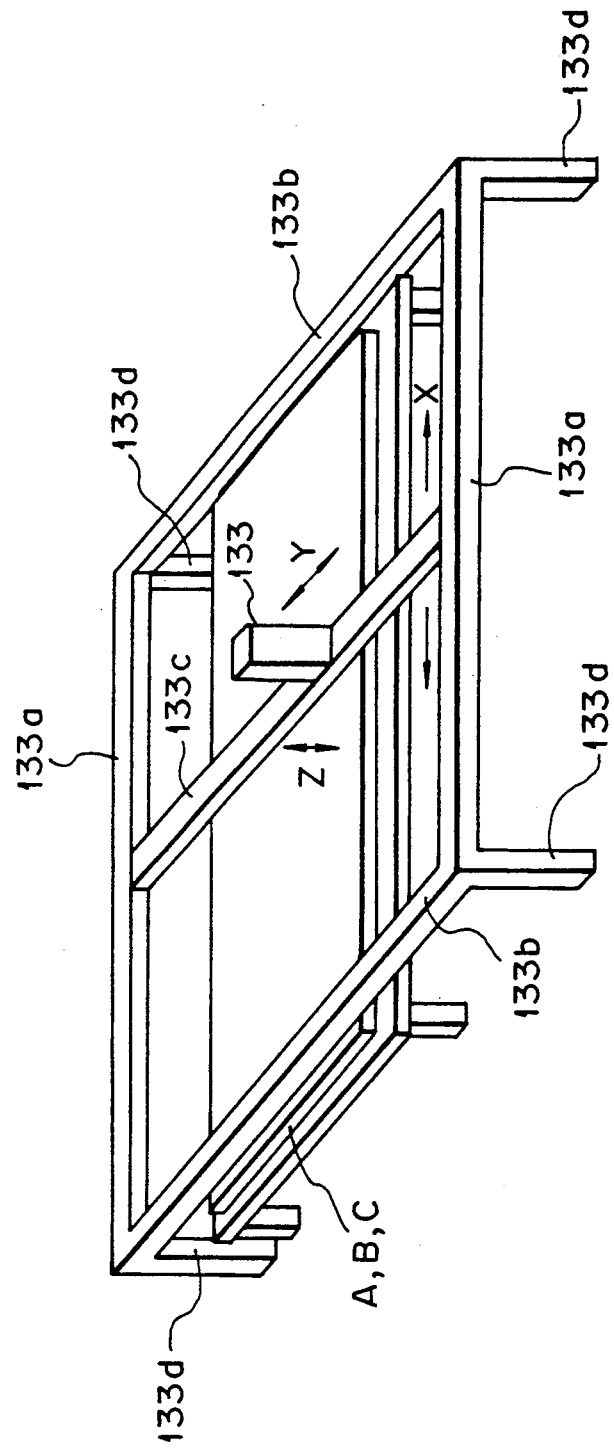
FIG. 4B shows movement of a robot.

FIG. 4B shows an example of the relations of a matrix waveguide and a robot.

A circuit test portion (A), an optical amplifier portion (B), and a jumper portion (C) which have at least one matrix waveguide are placed on a flat support, and a robot 133 is arranged so that the robot can move any desired position on each portions.

The numeral 133d shows columns, on which rectangular frames 133a and 133b are supported. A carrier 133c which carries a robot 133 is slidably mounted on the frame 133a so that it slides along the frame 133a in X-direction. The robot 133 can slide along the carrier 133c in Y-direction. Therefore, the robot 133 can be positioned at any desired position on a matrix waveguide on the circuit test portion (A), or the jumper portion (C), by sliding the carrier 133c along the frame 133a, and/or sliding the robot 133 along the carrier 133c.

When the robot 133 is positioned on the desired crosspoint, the robot 133 is lowered in Z-direction so that a nozzle of the robot touches with a matrix waveguide so that matching oil is supplied or pulled out. The operation of the robot is described in detail later.

Next, the detailed structure of a groove on a matrix waveguide is described.

Figure 5A:
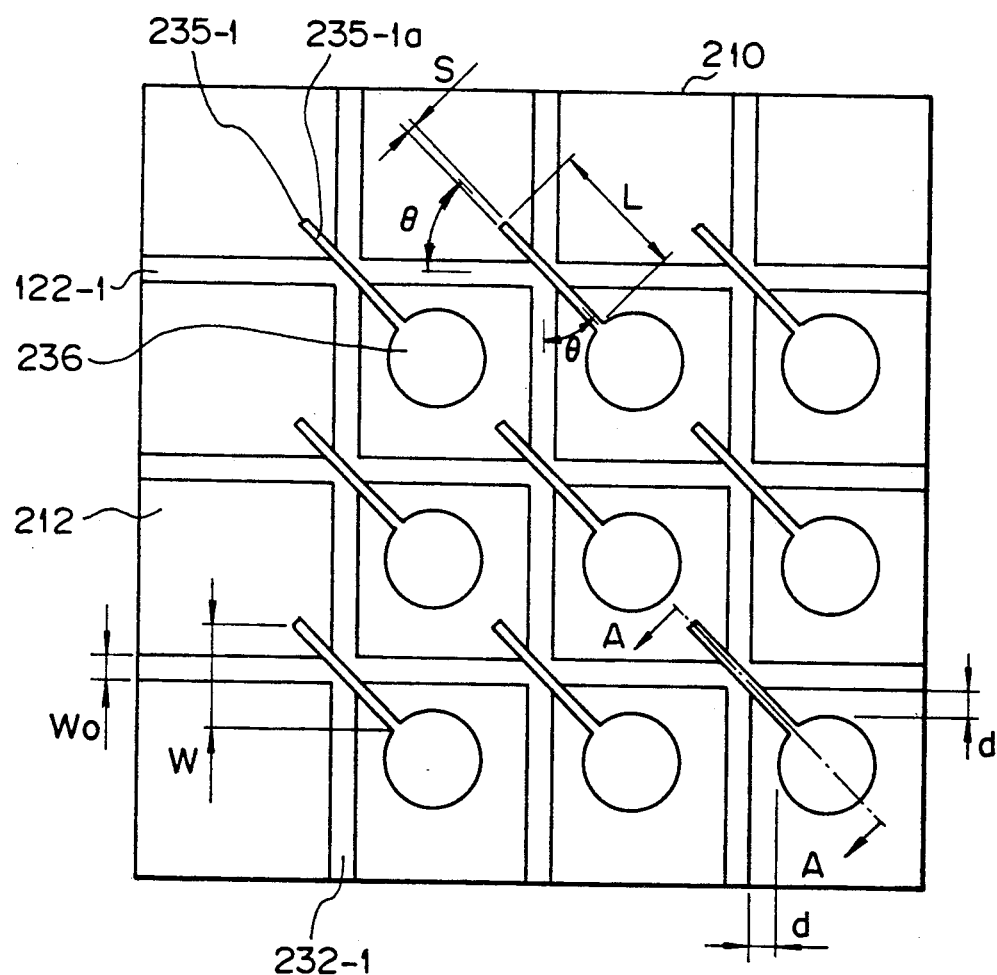
FIG. 5A shows a plane view of detailed crosspoint.
Figure 5B:
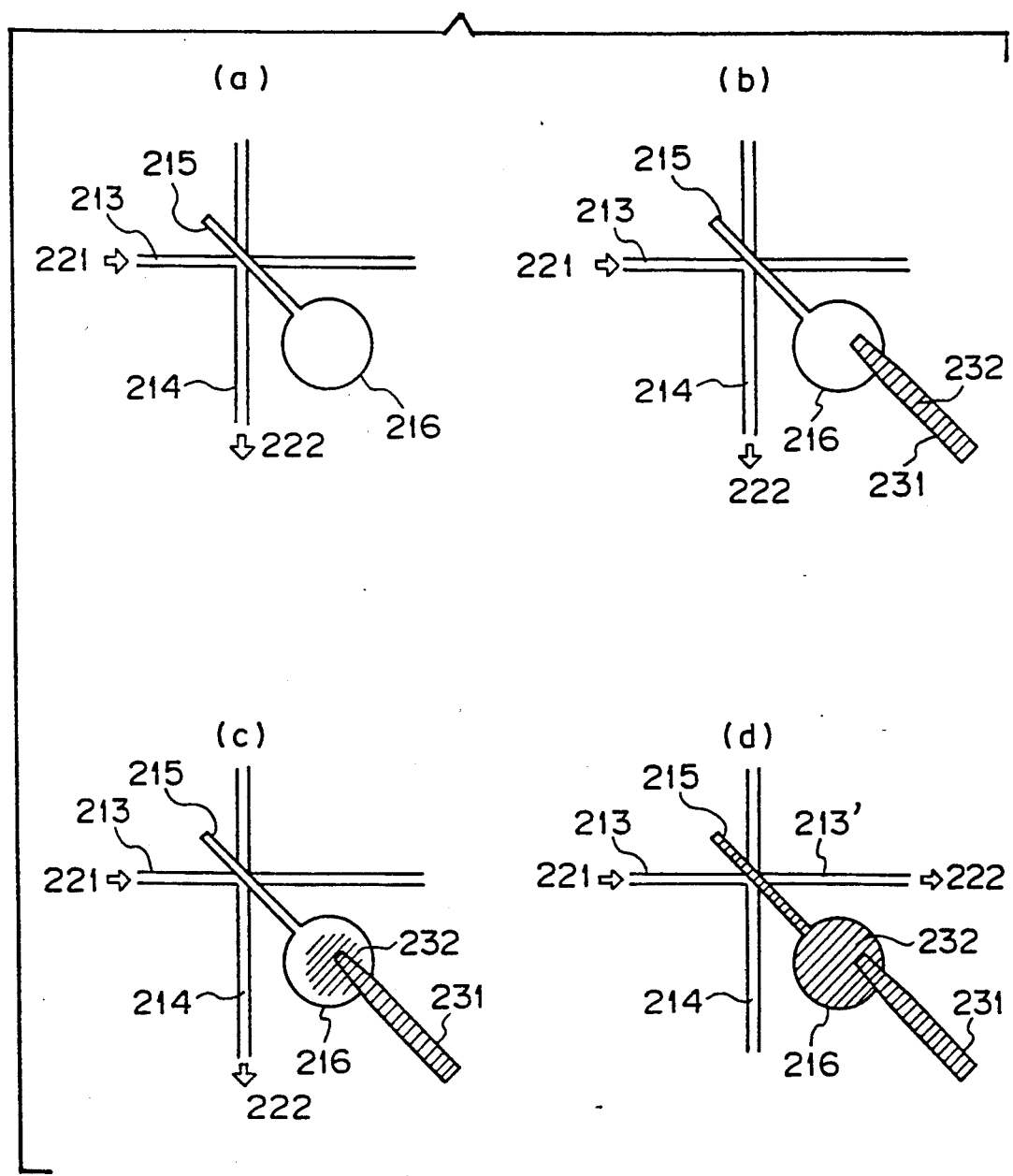
FIG. 5B shows operation of filling and pulling out matching oil in an oil pool.
Figure 6:
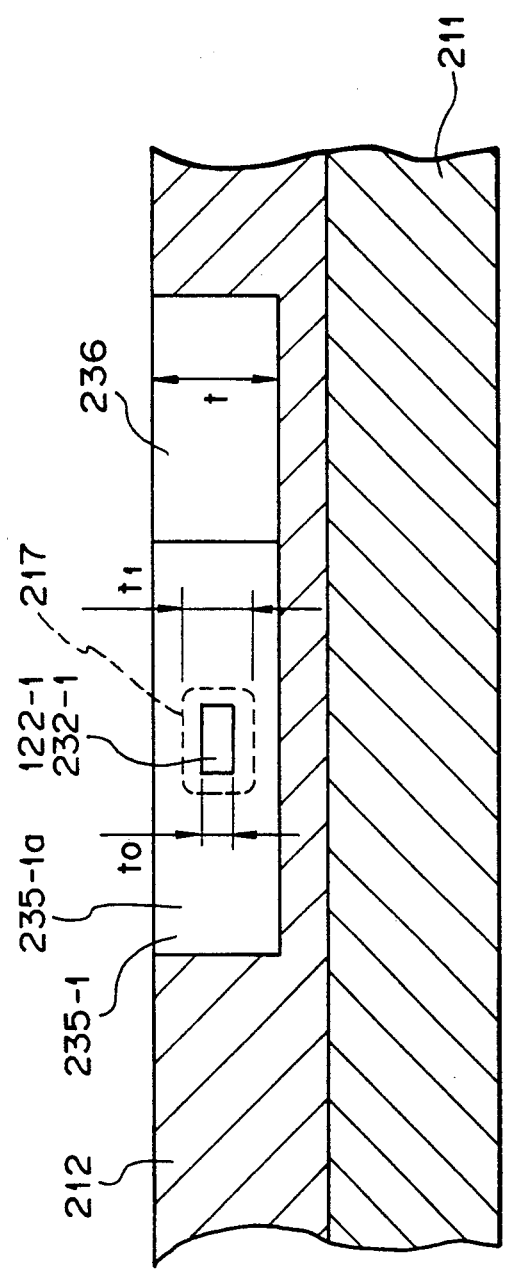
FIG. 6 shows a cross section of a groove along the line A—A of FIG. 5A.

FIGS. 5A, 5B and 6 show the detailed structure of a groove, and FIG. 6 shows a cross section along the line A—A of FIG. 5A. In those figures, it is assumed that a matrix waveguide 210 has 3×3 crosspoints, and each crosspoint has a groove 235-1 slanted to waveguides, and an oil pool 236 is coupled with a respective groove. The numeral 211 is a substrate of a matrix waveguide, 212 is a clad and core layer of the waveguides, 122-1 is a waveguide for an input light, 232-1 is a waveguide for an output light, 235-1 is a groove. The numerals 122-1, 232-1, and 235-1 are the same as those in FIG. 4.

On the substrate 211, waveguides with a core width $W_0$, depth $t_0$, and refractive index n are buried in a clad and core layer 212. A linear groove 235-1 is provided at each crosspoint of waveguides so that the angle $\theta$ between the longitudinal direction of the groove and the longitudinal direction of a waveguide is less than $\cos^{-1}(1/n)$.

An intersecting angle between a horizontal waveguide 122-1 and a vertical waveguide 232-1 is $2\theta$, so that both the horizontal waveguide and the vertical waveguide satisfy the specific angle $\theta$ with a groove. When n=1.46, the angle $\theta$ is equal to or less than 46.8°.

An oil pool 236 is provided close to each groove with the spacing d between a waveguide and an oil pool.

The following equations are satisfied with a groove and an oil pool.

$$L = W/\cos\theta > t_1 \qquad (1)$$

$$t > t_1 \qquad (2)$$

$$d > (t_1 - t_0)/2 \qquad (3)$$

where L is length of a groove, $t_1$ is thickness of a layer 217 where a light signal oozes out into a clad layer, t is depth of an oil pool, and $t_0$ is depth of a waveguide.

An area of a sidewall 235-1a of a groove 235-1 is larger than an area 217 which a light signal oozes out.

The width s of a groove 235-1 affects much to light loss in a waveguide, and the value s is determined based upon an allowable loss and size of a matrix. The following equation is satisfied between the width s and the transmission loss Ls, where ($\lambda$) is wavelength, and w is a spot diameter of a light signal.

$$Ls = 10 \log[1 + (\lambda \cdot s/2\pi n w^2)^2] \qquad (4)$$

The width s must be, for instance, less than 20 $\mu$m so that the loss in each groove is less than 0.1 dB in a silica group single-mode waveguide with the wavelength less than 1.3 $\mu$m, in the equation (4).

When the pitch of waveguides is 250 $\mu$m, the diameter of an oil pool may be an order of 100 $\mu$m. The positioning error of an oil nozzle of a robot for supplying oil into a groove must be less than 10 $\mu$m if no oil pool is provided, and said positioning error may be around 50 $\mu$m if an oil pool is provided and an matching oil is supplied to a groove through an oil pool. The volume of an oil pool is an order of 1 nl, while the volume of a groove is 10 pl. As the volume of an oil pool is 100 times as large as that of a groove, the control of supplying oil is easy when an oil pool is provided. Further, even when oil in a groove is evaporated, fresh oil is supplied to the groove from the oil pool.

Therefore, the presence of an oil pool is an important feature of the present invention, and improves the stability of a light path, and operational reliability of an MDF system.

The operation of oil supply is described in accordance with FIG. 5B.

When a groove 215 is empty, a light 221 in an input waveguide 213 is reflected by the wall of the groove 215, and changes the direction. The output light 222 is provided in an output waveguide 214 (see FIG. 5B(a)).

When a nozzle 231 which is filled with matching oil 232 is located to the oil pool 216, the oil in the nozzle is pushed out into the oil pool by applying pressure to the oil (see FIG. 5B(b)).

The oil pushed out of the nozzle expands around the nozzle 231 (see FIG. 5B(c)).

When the oil reaches the side wall or the bottom of the oil pool, the oil expands through the surface tension between the oil and the side wall or the bottom of the oil pool, to the whole area of the oil pool. Then, the oil in the oil pool expands to the groove 215 through the surface tension (see FIG. 5B(d)).

Thus, the groove is filled with matching oil.

When the groove is filled with matching oil, the input light 221 in the input waveguide 213 goes straight through the groove 215, and goes into the waveguide 213' which is on the line of the input waveguide 213.

Next, a robot for supplying and pumping out matching oil to and from an oil pool is described.

Figure 7:
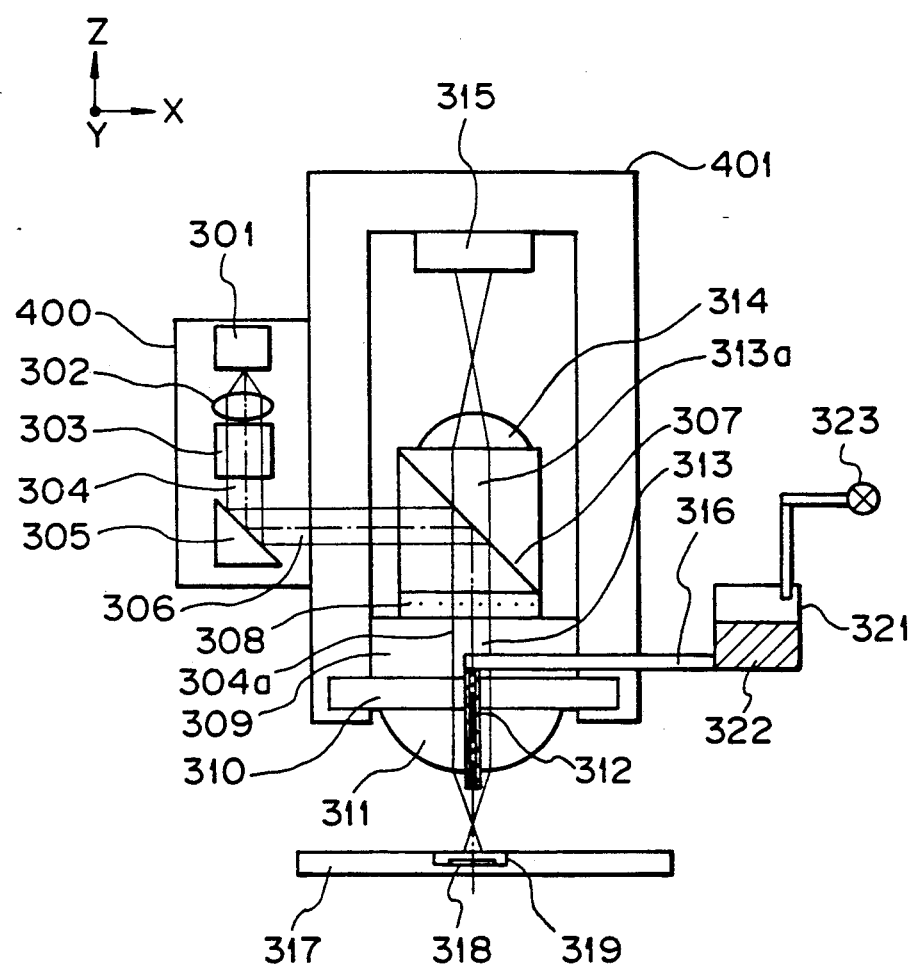
FIG. 7 shows structure of a robot.
Figure 8A:
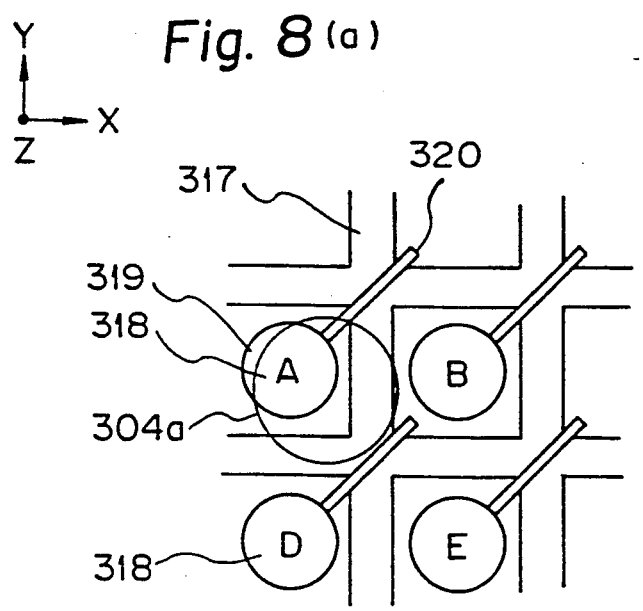
FIGS. 8(a) and 8(b) shows operation for positioning a robot on a desired oil pool.
Figure 8B:
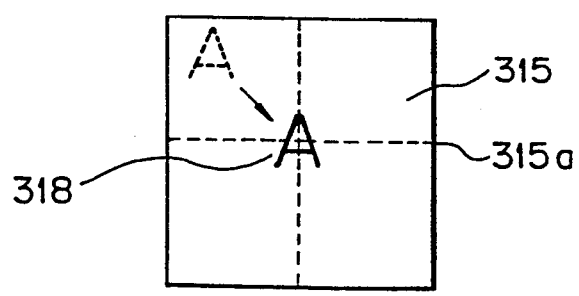
Figure 9A:
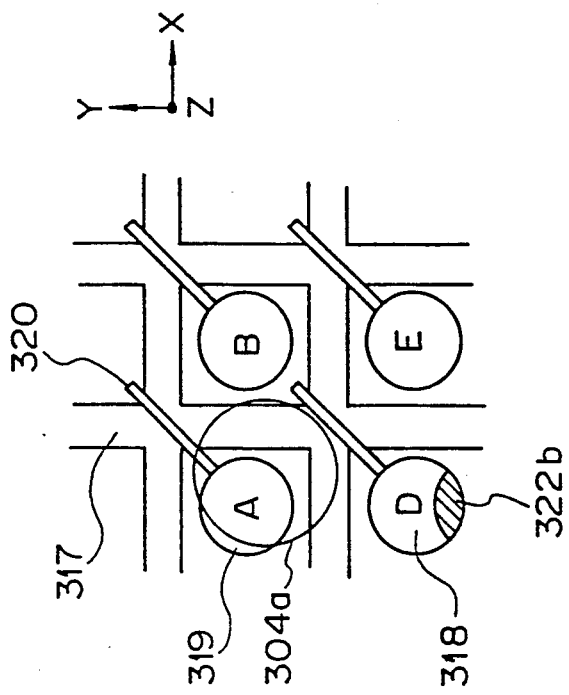
FIGS. 9(a) and 9(b) shows operation for supplying and pulling out matching oil.
Figure 9B:
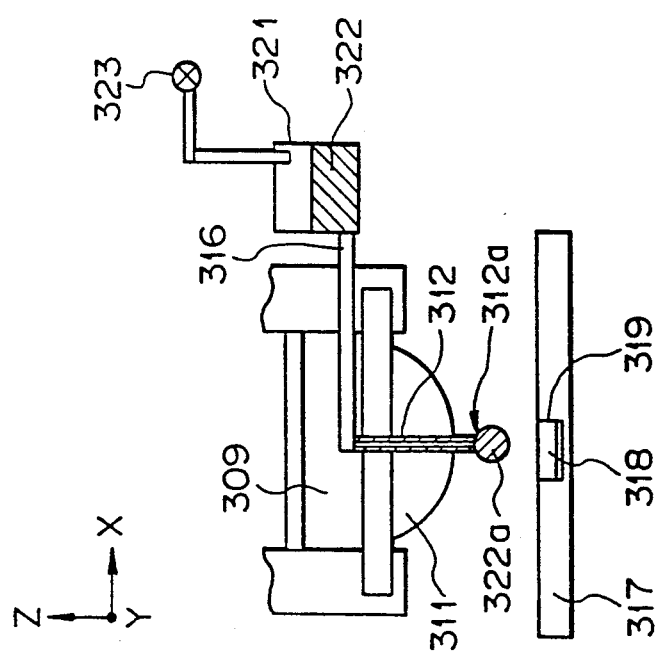

FIG. 7 shows structure of a robot, FIG. 8 shows operation of positioning of a robot on a desired oil pool, and FIG. 9 shows operation of supplying and/or pumping out matching oil. In those figures, the numeral 301 is a semiconductor laser, 302 is a collimating lens, 303 is an anamorphic prism pairs, 304 is a linearly polarized parallel beam, 304a is a circularly polarized light, 305 is a total reflection prism, 306 is a center line of a parallel beam, 307 is a polarized beam splitter, 308 is a quarter wave plate, 309 is a transparent glass plate, 310 is a lens holder, 311 is an objective lens, 312 is a transparent thin hose, 313 is a circularly polarized reflection beam, 313a is a linearly polarized reflection beam, 314 is an ocular lens, 315 is a CCD (charge coupled device), 316 is a transparent hose, 317 is a matrix waveguide, 318 is a reflection pattern which shows an address of a groove provided at bottom of an oil pool, 319 is an oil pool, 320 is a groove, 321 is an oil tank, 322 is matching oil, 323 is a pump, 400 and 401 are casings.

According to the present invention, a robot is positioned above an oil pool which is connected to a desired groove which is subject to be filled with or pumped out matching oil.

An output beam of the semiconductor laser 301 passes the collimating lens 302, and the anamorphic prism pairs 302, and is shaped to a linearly polarized parallel spot beam. Then, the beam is offset by 90° by the total reflection prism 305, and then, applied to the polarized beam splitter 307. The total reflection prism 305 is used for decreasing the size of an apparatus. If no total reflection prism 305 is used, the semiconductor laser 301, the collimating lens 302, the anamorphic prism pairs 303 are located on the optical axis 306 in the x-direction.

The polarized beam splitter 307 offsets the input linearly polarized parallel beam 304 by 90° into the z-direction, and then, the quarter wave plate 308 converts a linearly polarized beam 304 to a circularly polarized beam 304a. Next, the circularly polarized beam 304a passes the transparent glass plate 309, and illuminates the reflection pattern 318 buried in the oil pool 319 along a waveguide 317, through the objective lens 311 which is fixed to the lens holder 310. The objective lens 311 focuses the beam on the reflection pattern.

The diameter of the illumination spot 304a is a little larger than the diameter of the reflection pattern 318 as shown in FIG. 8(a).

The circularly polarized reflection beam 313 which is reflected by the reflection pattern 318 passes the quarter wave plate 308 and the polarized beam splitter 307, and is converted to a linearly polarized beam 313a whose phase differs by 90° from that of the input circularly polarized beam 304a. Then, the reflection beam passes the polarized beam splitter 307.

It should be noted that the combination of the linearly polarized parallel beam 304 of the semiconductor laser 301, the polarized beam splitter 307, the quarter wave plate 308 provides the decrease of the return light noise to the semiconductor laser 301, and the efficient use of a light through total reflection of an input light, and a total transmission of a reflection light in the polarized beam splitter 307.

The linearly polarized reflection beam 313a which is output by the polarized beam splitter 307 provides an enlarged image of the reflection pattern 308 on the CCD device 315, through the ocular lens 314. The image of the reflection pattern 318 on the CCD device 315 provides the address of a groove 320. And, through the calculation of center of the reflection pattern 318 by a pattern processing technique, a robot is positioned on a desired oil pool 319 by shifting the robot so that the optical axis of the CCD 315 coincides with the center of the reflection pattern.

The operation of supplying and pumping out matching oil is described in accordance with FIG. 9.

When a robot is positioned on the desired oil pool 319 which is coupled with the desired groove 320, the pump 323 forwards the matching oil 322 in the oil tank 321 to the oil pool 319 through the transparent hose 316 and the transparent thin hose 312. The matching oil 322b supplied to the oil pool 319 is transferred to the groove 320 through the surface extension of the side wall and/or the bottom of the oil pool, and the surface extension of the groove. The oil is supplied to the oil pool by touching an oil sphere 322a at the top 312a of the thin hose 312 with the side wall or the bottom of the oil pool 319.

When the matching oil is pumped out of the oil pool, the pump 323 provides the negative pressure in the hoses 316 and 312 after the thin hose 312 is placed into the oil pool 319, so that the matching oil in the oil pool is pumped out through the hoses 312 and 316.

It should be noted that the transparent hose 316 is adhered to the transparent glass plate 309 by using transparent adhesive, and the thin hose 312 which penetrates the center of the objective lens 311 is also transparent, and therefore, the image characteristics are not affected by the presence of the hoses 316 and 312. The transparency in this case means that the hoses have the same refractive index as that of the objective lens, and they do not absorb light (transparent).

Figure 10:
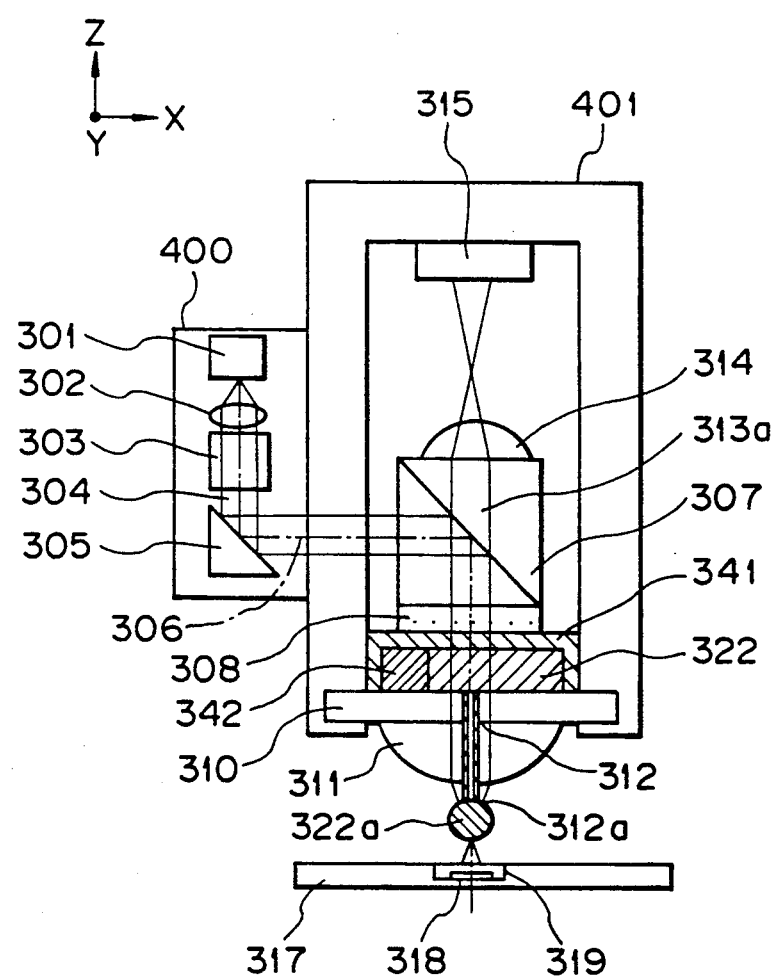
FIG. 10 shows another embodiment of a robot.

FIG. 10 shows a modification of a robot, and the same numerals as those in FIG. 7 show the same members. In FIG. 10, the numeral 341 is a matching oil tank, which includes matching oil 322 and a volume change device 342. When the volumn of the device 342 increases a little, some pressure difference occurs between the oil tank 341 and the top of the thin hose 312a, and therefore, some oil in the tank 341 flows into the thin hose 312. The oil thus flown into the hose provides a small sphere 322a at the outlet 312a of the hose 312. The volume of the sphere 322a is the same as the volume change of the device 342. Thus, the precise control of the volume of oil is possible in the embodiment of FIG. 10. The oil sphere is transferred to the oil pool through the surface tension effect between the oil and the side wall or bottom of the oil pool. The oil in the oil pool is pumped out by decreasing the volume of the volume change device 342.

Figure 11:
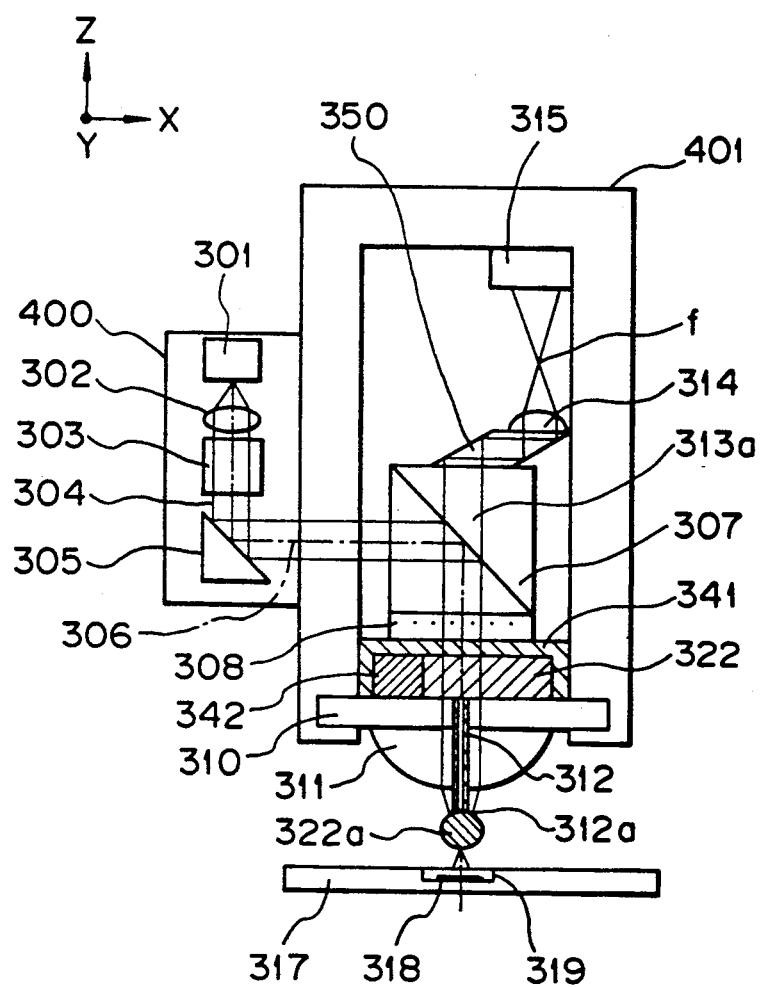
FIG. 11 shows still another embodiment of a robot.

FIG. 11 shows the modification of FIG. 10, and the same numerals in those figures show the same members. FIG. 12 shows the operation of the focusing system. The feature of FIG. 11 is that it has the automatic focusing system. FIG. 12 shows the operation of FIG. 11. In FIG. 11, the numeral 350 shows a critical angle prism, 351 is an input light beam into said critical angle prism 350, 351a is an optical axis of an input beam of the critical angle prism 350, 352 is a convergent light, 352a is an upper portion light than the optical axis of the convergent light 352, 315L is left side half of the CCD device 315, 315R is right side half of the CCD device 315, 353 is a divergent light, 353a is lower half portion than the optical axis of the divergent light 353.

A reflection beam 313a in FIG. 11, reflected by a reflection pattern 318 and transmitted the polarized beam splitter 307, is applied to the critical angle prism 350 which has a slant wall with a predetermined critical angle $\theta_c$. The light applied to the critical angle prism 350 is total reflected when it is focused (see FIG. 12(b)).

When a reflection pattern 318 is farer than the focusing point, the input light applied to the critical angle prism 350 is convergent light 352, and so the upper half light 352a than the optical axis 351a transmits the critical angle prism 350. Therefore, the right half on the CCD is dark as compared with the left half (see FIG. 12(a)).

On the other hand, when the reflection pattern 318 is nearer than focusing point, the input beam 351 applied to the critical angle prism 350 is a divergent light 353. In this case, the half light 353a lower than the optical axis 351a transmits the prism 350, and therefore, the left half 315L on the CCD device 315 is dark as compared with the right half (see FIG. 12(c)) [see also FIG. 12(d).]

Accordingly, the focusing operation is carried out so that the brightness of left half is the same as that of right half. The focusing operation is carried out by shifting the robot in the z-direction.

The focusing system is not restricted to the critical angle system, but other focusing system may be used in the present invention. For instance, a knife edge system in which a knife edge is placed at a focusing point f of the ocular lens 314.

It should be noted of course that the focusing system may be combined with the embodiment of FIG. 7.

Although a semiconductor laser which provides coherent light is described in the above embodiments, an incoherent light by LED is of course possible in the present invention. In the latter case, a simple beam splitter may be used, instead of a polarized beam splitter and a quarter wave plate, since no return light noise to a semiconductor laser exists in the case of an LED light.

It is the feature of the present invention that the oil hose to an oil pool coincides with an optical axis of an objective lens. The high speed and precision positioning of a robot together with the high operational reliability of supplying and/or pumping out matching oil is obtained by above structure.

Finally, some specific advantages of the present invention are enumerated.

a) A jumper operation in an MDF system is carried out automatically by using a robot.

b) A single robot can function both for jumper operation, and for circuit test.

c) Because of the presence of an oil pool coupled with a groove, the positioning and the operation of a robot are stable.

d) As a nozzle of a robot is positioned at the center of an objective lens, the positioning of a robot on the desired oil pool is easy, and the operational reliability of a robot is high.

From the foregoing, it will now be apparent that a new and improved automated optical MDF system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. Automated optical main distributing frame (MDF) system comprising;
   a jumper section having a link with at least one matrix waveguide deposited on a substrate with a plurality of waveguides intersecting one another at crosspoints,
   said waveguides being coupled with external optical lines and office optical lines so that each of external lines is connected to a selected office line through a crosspoint of the matix waveguide,
   each crosspoint of said matrix waveguide having a groove which is slanted to waveguides by a predetermined angle and is subject to be selectively filled with matching oil which has essentially the same refractive index with that of a waveguide so that a light signal in a waveguide goes straight through the crosspoint when a groove is filled with matching oil, and the light signal changes its direction to another waveguide at the crosspoint through total internal reflection by the groove when the groove is empty,
   a robot coupled with said matrix waveguide so that the robot is positioned at desired crosspoint of the matrix waveguide to fill and pull out matching oil in a designated groove.

2. Automated optical MDF system according to claim 1, wherein each of said groove is coupled with a respective oil pool through a thin conduit, said oil pool is subject to be selectively filled with matching oil, and volume of said oil pool is much larger than that of a groove, and oil to a groove is supplied through the related oil pool.

3. Automated optical MDF system according to claim 2, wherein said oil pool is positioned spaced from a waveguide so that refractive index of the waveguide is not affected by presence of the oil pool.

4. Automated optical MDF system according to claim 2, wherein an oil pool is located at deeper position on a substrate that a groove.

5. Automated optical MDF system according to claim 1, wherein inequality $\theta < \cos^{-1}(1/n)$ is satisfied, where n is refractive index of a waveguide and matching oil, and $\theta$ is angle between a groove and a incident light signal to the groove.

6. Automated optical MDF system according to claim 1, wherein wall of a groove is larger than area where light signal exists in a waveguide.

7. Automated optical MDF system according to claim 1, wherein a reflection chip relating to a respective groove is buried close to said groove.

8. Automated optical MDF system according to claim 1, wherein a directional coupler having three ports is inserted between each external optical line and an input of said matrix waveguide, so that a first port is coupled with the external optical line, a second port is coupled with the matrix waveguide, and a third port is coupled with a common test circuit, wherein a light signal from a first port is output to a second port and a third port, and a light signals from a second port and a third port are output to a first port.

9. Automated optical MDF system according to claim 8, wherein a second matix waveguide having $1 \times n$ crosspoints, where n is an integer, is provided between each third ports of said directional coupler, and said common test circuit, so that the common test circuit is coupled with the desired external optical line selected by said second matrix waveguide.

10. Automated optical MDF system according to claim 9, wherein an optical amplifier is provided between second port of said directional coupler and an input of the first matrix waveguide.

11. Automated optical MDF system according to claim 9, wherein said matrix waveguide, said second waveguide, and said directional coupler are deposited on a common single substrate.

12. Automated optical MDF system according to claim 1, wherein said robot comprises;
a housing,
an objective lens fixed to said housing,
a transparent hose penetrating center of said objective lens,
illumination means for illuminating a reflection chip in an oil pool through the objective lens,
an imaging means for imaging said reflection chip illuminated by said illumination means on a photo detector which is fixed to the housing,
a focusing means for focusing an image on said imaging means,
an oil tank coupled with said hose,
a pump coupled with said hose for supplying oil in said oil tank to a groove, and pumping out oil in a groove, and
means for producing oil chip at outlet of said hose so that said oil chip is supplied to the oil pool in a matrix waveguide through surface tension between oil and an oil pool.

13. Automated optical main distributing frame (MDF) system comprising;
a plurality of optical directional couplers having three ports, a first port of each directional coupler being coupled with an external optical line, a second port being coupled with a second matrix waveguide, a third port being coupled with a first matrix waveguide,
a jumper section having a link with at least one of said first matrix waveguide deposited on a substrate with a plurality of waveguides intersecting one another at crosspoints,
said first waveguide being coupled with external optical lines through said directional couplers and office optical lines so that one of external lines is connected to selected office line through a crosspoint of the first matrix waveguide,
each crosspoint of said first matrix waveguide having a groove which is slanted to waveguides by a predetermined angle and is subject to be filled with matching oil which has essentially the same refractive index with that of a waveguide so that a light signal in a waveguide goes straight through the cross point when a groove is filled with matching oil, and the light signal changes its direction to another waveguide at the crosspoint through total internal reflection by the groove when the groove is empty,
a second matix waveguide of $1 \times n$ crosspoints of similar structure to that of the first matrix waveguide,
said second matrix waveguide being coupled with third ports of said directional couplers, and a signal test device which is subject to be coupled with selected external optical line through said second matrix waveguide, and said directional couplers, first matrix waveguide and second matrix waveguide being deposited on a common substrate.

14. Automated optical MDF system according to claim 12, wherein said pump is a volume change device.

15. Automated optical MDF system according to claim 12, wherein said focusing means comprises a critical angle prism.

* * * * *